United States Patent [19]
Ohtake

[11] Patent Number: 5,493,447
[45] Date of Patent: Feb. 20, 1996

[54] SMALL-SIZED ZOOM LENS

[75] Inventor: Motoyuki Ohtake, Ohmiya, Japan

[73] Assignee: Nikon Corporation, Tokyo, Japan

[21] Appl. No.: 299,410

[22] Filed: Sep. 1, 1994

[30] Foreign Application Priority Data

Sep. 2, 1993 [JP] Japan .................................. 5-242042

[51] Int. Cl.⁶ .................................................. G02B 15/14
[52] U.S. Cl. ............................................. 359/686; 359/683
[58] Field of Search ..................................... 359/686, 683, 359/676

[56] References Cited

FOREIGN PATENT DOCUMENTS 1-252915  10/1989  Japan .
2-73211   3/1990   Japan .
2-73322   3/1990   Japan .

Primary Examiner—Scott J. Sugarman
Attorney, Agent, or Firm—Shapiro and Shapiro

[57] ABSTRACT

The purpose of the present invention is to provide a zoom lens capable of reducing the whole length of the zoom lens in a telescopic end and effective diameters of front lenses thereof, decreasing the number of lenses thereof to enable miniaturization of the zoom lens, and obtaining great zoom ratio. The zoom lens of the present invention has, in the following order from the object side, a first lens group G1 with a positive refractive power, a second lens group G2 with a negative refractive power, a third lens group G3 with a positive refractive power and a fourth lens group G4 with a negative refractive power wherein in a refractive power varying operation from a wide-angle end to a telescopic end, the first lens group G1 and the fourth lens group G4 are moved to the object side, the distance of an air space between the first lens group G1 and the second lens group G2 is increased and the distance of an air space between the third lens group G3 and the fourth lens group G4 is decreased, the following condition is satisfied:

$1.47<(dt34-dw34)\cdot\psi 3\cdot\psi 4\cdot(Ft-Fw)<2.00$, $Fw/r4<-0.1$.

6 Claims, 4 Drawing Sheets

SMALL-SIZED ZOOM LENS

BACKGROUND OF THE INVENTION

1. Field of the Invention

The present invention relates to a zoom lens and more particularly to a small-sized zoom lens suitable for a compact camera.

2. Related Background Art

In taking lenses for recent shutter-type compact cameras, zoom lenses become the mainstream.

A zoom lens formed of positive and negative lens groups (two lens groups) is simple in structure and has a first lens group with a positive refractive power and a second lens group with a negative refractive power. For example, as such a zoom lens, there is a zoom lens disclosed in Japanese Patent Laid-Open Application No. 2-73322 wherein the zoom ratio is 2 to 1 and the number of lenses is small. In this zoom lens, in order to secure a sufficient back focus in a wide-angle end and to correct the positive distortion preferably, the image principal point of a positive lens group is located on the image side beyond a lens surface of the positive lens group located closest to the image side.

As zoom lenses with great zoom ratio, e.g., a zoom lens formed of positive, negative, positive and negative lens groups (four lens group) and a zoom lens formed of positive, positive and negative lens groups (three lens group) are known in which the number of lens groups is increased and the respective lens groups are moved independently in a refractive power varying operation from a wide-angle end to a telescopic end.

The zoom lens formed of the positive, positive and negative lens groups (three lens group) has, in the following order from the object side, a first lens group with a positive refractive power, a second lens group with a positive refractive power and a third lens group with a negative refractive power. When varying a refractive power from a wide-angle end to a telescopic end, the distance of an air space between the second lens group and the third lens group is decreased and the distance of an air space between the first lens group and the second lens group is increased, thereby enabling great zoom ratio.

For example, in a zoom lens disclosed in Japanese Patent Laid-Open Application No. 2-73211, a second lens group has a 2a lens group with a negative refractive power disposed on the object side and a 2b lens group with a positive refractive power disposed on the image side. And, by securing the distance between the 2a lens group and the 2b lens group properly widely, the negative distortion is produced by the 2a lens group in a wide-angle end to correct the positive distortion preferably, making it possible to obtain a sufficient back focus to achieve a wide-angle end to realize great zoom ratio.

On the other hand, for example, in Japanese Patent Laid-Open Application No. 1-252915, a zoom lens (formed of positive, negative, positive and negative lens groups (four lens groups)) has, in the following order from the object side, a first lens group with a positive refractive power, a second lens group with a negative refractive power, a third lens group with a positive refractive power and a fourth lens group with a negative refractive power. When varying a refractive power from a wide-angle end to a telescopic end, the distance between the first lens group and the second lens group is increased and the distance between the third lens group and the fourth lens group is decreased. Thereby, a change of the whole length of the zoom lens due to the refractive power varying operation is limited, making it possible to reduce the whole length of the zoom lens in the telescopic end as compared to the zoom lens formed of the positive and negative lens groups (two lens groups).

However, when achieving great zoom ratio in the zoom lens formed of the positive and negative lens groups (two groups), a change of the magnification of the negative lens group in the refractive power varying operation from the wide-angle end to the telescopic end becomes large. Therefore, it becomes difficult to preferably limit changes of various aberrations caused by the negative lens group during moving the lens groups.

Also, when achieving a wide-angle in the zoom lens formed of the positive and negative lens groups (two groups), a sufficient back focus cannot be obtained in the wide-angle end and effective diameters of rear lenses become large. Further, movement of the negative lens group is increased in the refractive power varying operation from the wide-angle end to the telescopic end. Also, since the image principal point of the positive lens group is located on the image side beyond the lens surface of the positive lens group located closest to the image side as mentioned above, the whole length of the zoom lens in the telescopic end becomes large, which is therefore insufficient in terms of miniaturization.

The zoom lens formed of the positive, positive and negative lens groups (three lens groups), in Japanese Patent Laid-Open Application No. 2-73211, is suitable for obtaining great zoom ratio as compared to the zoom lens formed of the positive and negative lens groups (two lens groups). However, as mentioned above, since the 2a lens group has a diverging function and the distance between the 2a lens group and the 2b lens group is made large, the whole length of the zoom lens becomes large in the telescopic end as compared to the effective focal length, so it is insufficient to reduce the whole length of the zoom lens.

In the zoom lens formed of the positive, negative, positive and negative lens groups (four lens groups) in Japanese Patent Laid-Open Application No. 1-252915, as the distance of the air space between the second lens group and the third lens group is decreased in the refractive power varying operation from the wide-angle end to the telescopic end, zoom ratio larger than that of the zoom lens formed of the positive, positive and negative lens groups (three lens groups) can be obtained and the whole length of the zoom lens in the telescopic end can be reduced. However, since the refractive power of the second lens group is considerably large toward the negative side as compared to that of the fourth lens group, the reduction of the whole length of the zoom lens in the telescopic end is not sufficient. Also, as varying the refractive power from the wide-angle end to the telescopic end, principal rays passing the first lens group are spaced apart from the optical axis, so that the effective diameters of front lenses become large.

SUMMARY OF THE INVENTION

It is therefore an object of the present invention to provide a zoom lens capable of reducing the whole length of the zoom lens in a telescopic end and effective diameters of front lenses thereof, decreasing the number of lenses thereof to enable miniaturization of the zoom lens, and obtaining great zoom ratio.

In order to achieve the above object, a zoom lens of the present invention has, in the following order from the object side, a first lens group G1 with a positive refractive power, a second lens group G2 with a negative refractive power, a third lens group G3 with a positive refractive power and a fourth lens group G4 with a negative refractive power, wherein in a refractive power varying operation from a wide-angle end to a telescopic end, the first lens group G1 and the fourth lens group G4 are moved toward the object side, the distance of an air space between the first lens group G1 and the second lens group G2 is increased and the distance of an air space between the third lens group G3 and the fourth lens group G4 is decreased, and if the refractive power of the third lens group G3 is $\psi3$, the refractive power of the fourth lens group G4 is $\psi4$, the axial distance of the air space between the third lens group G3 and the fourth lens group G4 in the wide-angle end is dw34, the axial distance of the air space between the third lens group G3 and the fourth lens group G4 in the telescopic end is dt34, an effective focal length of the whole zoom lens system in the wide-angle end is Fw, an effective focal length of the whole zoom lens system in the telescopic end is Ft, and a radius of curvature of a lens surface of the fourth lens group G4 located closest to the image side is r4, the following condition is satisfied:

$$1.47 < (dt34-dw34)\cdot\psi3\cdot\psi4\cdot(Ft-Fw) < 2.00, \; Fw/r4 < -0.1$$

In a preferred embodiment of the present invention, if an effective focal length of the first lens group G1 is f1, an effective focal length of the second lens group G2 is f2, an effective focal length of the fourth lens group G4 is f4, and the effective focal length of the whole zoom lens system in the telescopic end is Ft, the following condition is satisfied:

$$0.4 < f1/Ft < 0.8,$$

$$0.4 < f4/f2 < 1.0$$

Further, it is preferable to move the first lens group G1 and the fourth lens group G4 together as one body in the refractive power varying operation from the wide-angle end to the telescopic end.

In the zoom lens of the present invention has, in the following order from the object side, the first lens group G1 with the positive refractive power, the second lens group G2 with the negative refractive power, the third /lens group G3 with the positive refractive power and the fourth lens group G4 with the negative refractive power. And, in the refractive power varying operation from the wide-angle end to the telescopic end, the distance between the first lens group G1 and the second lens group G2 is increased, the distance between the second lens group G2 and the third lens group G3 is decreased and the distance between the third lens group G3 and the fourth lens group G4 is decreased.

Also, it is preferable to dispose a stop S in the vicinity of the center of the lens system (the whole system including a lens surface closest to the object side to a lens surface closest to the image side). In particular, it is preferable to dispose the stop S between the second lens group G2 and the third lens group G3, in the third lens group G3 or between the third lens group G3 and the fourth lens group G4.

When aiming at a wide-angle, as the refractive power arrangement of the zoom lens system is asymmetrical with respect to the stop S, and in particular, the fourth lens group G4 is disposed in the position away from the stop S, the positive distortion is liable to occur. Therefore, by making the composite refractive power of the first lens group G1 and the second lens group G2 negative in the wide-angle end, the positive distortion is preferably corrected and a sufficient back focus can be obtained.

On the other hand, the first lens group G1 has the positive refractive power and a composite refractive power of the second lens group G2, the third lens group G3 and the fourth lens group G4 in the telescopic end becomes negative. Thus, as the refractive power arrangement of the whole zoom lens system is a telephoto type, it is possible to reduce the whole length of the zoom lens in the telescopic end (the length on the optical axis from a lens surface located closest to the object side to a Gauss image surface with respect to an object in infinity).

In general, miniaturization is required for a zoom lens to be used in a compact camera. For the miniaturization, there are several factors such as reduction of the whole lens system in the telescopic end, reduction of diameters of lenses thereof, reduction of the thickness of the whole lens system (from a lens surface of the whole lens system located closest to the object side to a lens surface thereof located closest to the image side) with the lens barrel retracted, etc. In the present invention, in particular, the reduction of the whole length of the zoom lens in the telescopic end is achieved.

As mentioned above, in the zoom lens formed of the positive, positive and negative zoom lens (three groups), in the refractive power varying operation from the wide-angle end to the telescopic end, the distance of the air space between the 2a lens group with the negative refractive power and the 2b lens group with the positive refractive power is constant and the whole length of the zoom lens is large in the telescopic end. Therefore, in the present invention, in the refractive power varying operation from the wide-angle end to the telescopic end, the distance between the second lens group G2 and the third lens group G3 is decreased to reduce the whole length of the zoom lens in the telescopic end.

If the refractive powers of the second lens group G2 and the third lens group G3 are $\psi2$ and $\psi3$ respectively, the distances of principal points between the second lens group G2 and the third lens group G3 in the wide-angle end and the telescopic end are dw23 and dt23 respectively, composite refractive powers $\psi w23$ and $\psi t23$ of the second lens group G2 and the third lens group G3 in the wide-angle end and the telescopic end are expressed as follows:

$$\psi w23 = \psi2 + \psi3 - dw23\cdot\psi2\cdot\psi3 \quad (a)$$

$$\psi t23 = \psi2 + \psi3 - dt23\cdot\psi2\cdot\psi3 \quad (b)$$

At this time, $\psi w23$ and $\psi t23$ are positive refractive powers and if $dt23 = dw23 - \Delta d23$, and when the equation (b) is substituted into the equation (a), the following equation (c) is obtained:

$$\psi t23 = \psi w23 + \Delta d23\cdot\psi2\cdot\psi3 \quad (c)$$

Thus, when considering the positive refractive powers of the second lens group G2 and the third lens group G3, the larger $\Delta d23$ becomes, the smaller $\psi t23$ becomes toward the positive side as compared to $\psi w23$, contributing to the refractive power varying operation.

Hereinafter, the respective conditions will be described in detail.

In the zoom lens of the present invention, the following conditions (1) and (2) are satisfied:

$$1.47 < (dt34-dw34)\cdot\psi3\cdot\psi4\cdot(Ft-Fw) < 2.00, \quad (1)$$

$$Fw/r4 < -0.1, \quad (2)$$

wherein $\psi3$: the refractive power of the third lens group G3

ψ4: the refractive power of the fourth lens group G4 dw34: the axial distance of the air space between the third lens group G3 and the fourth lens group G4 in the wide-angle end dt34: the axial distance of the air space between the third lens group G3 and the fourth lens group G4 in the telescopic end Fw: the effective focal length of the whole zoom lens system in the wide-angle end Ft: the effective focal length of the whole zoom lens system in the telescopic end r4: the radius of curvature of the lens surface of the fourth lens group G4 located closest to the image side.

The condition (1) defines, when moving the lens groups from the wide-angle end to the telescopic end, contribution of the change of the axial distance of the air space between the third lens group G3 and the fourth lens group G4 to the refractive power varying operation of the whole lens system and can be explained as follows.

If the refractive powers of the third lens group G3 and G4 are ψ3 and ψ4 respectively, the distances between principal points of the third lens group G3 and the fourth lens group G4 in the wide-angle end and the telescopic end are ew34 and et34 respectively, respective composite refractive powers ψw34 and ψt34 of the third lens group G3 and the fourth lens group G4 in the wide-angle end and the telescopic end are expressed as:

$$\psi w34 = \psi 3 + \psi 4 - ew34 \cdot \psi 3 \cdot \psi 4 \quad (d)$$

$$\psi t34 = \psi 3 + \psi 4 - et34 \cdot \psi 3 \cdot \psi 4 \quad (e)$$

Also, an amount Δψ34 of change of the composite refractive power of the third lens group G3 and the fourth lens group G4 during moving the lens groups from the wide-angle end to the telescopic end is expressed as:

$$\Delta\psi 34 = \psi w34 - \psi t34 \quad (f)$$

When the equations (d) and (e) are substituted into the equation (f), and if an amount of change of the distance between the principal points is Δe34= ew34−et34, the equation (f) can be expressed as:

$$\Delta\psi 34 = \Delta e34 \cdot \psi 3 \cdot \psi 4 \quad (g)$$

When the axial distances of the air spaces of the third lens group G3 and the fourth lens groups G4 in the wide-angle end and the telescopic end are dw34 and dt34 respectively, an amount Δd34 of change of the axial distance of the air space between the third lens group G3 and the fourth lens group G4 during moving the lens groups from the wide-angle end to the telescopic end is expressed as:

$$\Delta d34 = dw34 - dt34 \quad (h)$$

As the amount Δe34 of change of the distance between the principal points is equivalent to the amount Δd34 of change of the distance of the air space, the equation (h) is substituted into the equation (g) to obtain the following equation (i):

$$\Delta\psi 34 = \Delta d34 \cdot \psi 3 \cdot \psi 4 \quad (i)$$

When the effective focal lengths of the whole zoom lens system in the wide-angle end and the telescopic end are Fw and Ft, an amount ΔF of change of the effective focal length of the whole lens system is expressed as:

$$\Delta F = Ft - Fw \quad (j)$$

Thereby, the variable portion of the condition (1) can be obtained by the product of the equation (i) and the equation (j) as follows:

$$\Delta\psi 34 \cdot \Delta F = \Delta d34 \cdot \psi 3 \cdot \psi 4 \cdot (Ft-Fw) = (dt34-dw34) \cdot \psi 3 \cdot \psi 4 \cdot (Ft-Fw) \quad (k)$$

Thus, the condition (1) defines the amount Δψ34 of change of the composite refractive power of the third lens group G3 and the fourth lens group G4 with respect to the amount ΔF of change of the effective focal length of the whole zoom lens when moving the lens groups from the wide-angle end to the telescopic end.

When the upper limit of the condition (1) is violated, the whole length of the zoom lens in the telescopic end can be reduced, but the amount of change of the composite effective focal length of the third lens group G3 and the fourth lens group G4 during moving the lens groups from the wide-angle end to the telescopic end becomes large, so that changes of various aberrations cannot be limited preferably during that time.

On the other hand, when the lower limit of the condition (1) is violated, during moving the lens groups from the wide-angle end to the telescopic end, the contribution of the third lens group G3 and the fourth lens group G4 with respect to the refractive power varying operation becomes small, so that it is possible to limit changes of various aberrations occurring in the third lens group G3 and the fourth lens group G4 in the refractive power varying operation. However, in order to obtain predetermined zoom ratio, an amount of change of the magnification of the second lens group G2 becomes large during moving the lens groups from the wide-angle end to the telescopic end, so that changes of various aberrations ocurring in the second lens group G2 cannot be limited preferably.

The condition (2) defines a proper range of the radius of curvature of the lens surface of the fourth lens group G4 located closest to the image side.

The present invention is suitable for a zoom lens in which there is no limitation on the back focus. However, in order to reduce the whole length of a zoom lens, it is desirable to reduce a back focus to some extent in a wide-angle end.

When the upper limit of the condition (2) is violated, the back focus in the wide-angle end becomes short, causing the diameters of rear lenses to become large. Also, it becomes impossible to preferably limit the positive distortion in the wide-angle end.

Further, in the present invention, in addition to the above conditions, it is preferable to satisfy the following conditions (3) and (4):

$$0.4 < f1/Ft < 0.8 \quad (3)$$

$$0.4 < f4/f2 < 1.0, \quad (4)$$

wherein f1: the effective focal length of the first lens group G1 f2: the effective focal length of the second lens group G2 f4: the effective focal length of the fourth lens group G4.

The conditions (3) and (4) concern the reduction of the whole length of the zoom lens in the telescopic end.

Now, the lens system is discussed as formed thinly along the optical axis.

If the refractive power of the first lens group G1 is ψ1, the distance between the position of the principal point of the first lens group G1 in the telescopic end and the position of the composite principal point of the second lens group G2, the third lens group G3 and the fourth lens group G4 in the telescopic end is dt12, and the composite refractive power of the whole zoom lens is ψt, the back focus Bft and the whole length TL of the zoom lens are expressed as:

$$Bft = (1 - \psi1 \cdot dt12)/\psi t \quad (m)$$

$$TL = dt12 + Bft \quad (n)$$

By substituting the equation (m) into the equation (n), the whole length TL of the zoom lens can be expressed as:

$$TL = 1/\psi t + (1 - \psi1/\psi t)dt12 \quad (o)$$

The condition (3) defines a proper range of the ratio of the effective focal length of the first lens group G1 to the effective focal length of the whole zoom lens system in the telescopic end.

In order to reduce the whole length of the zoom lens, it is necessary that $(1-\psi1/\psi t)\,dt12<0$ holds in the equation (o). As $dt12>0$, the following expression (p) needs to hold:

$$1 < \psi1/\psi t \quad (p)$$

Therefore, in order to reduce the whole length of the zoom lens in the telescopic end, it is desirable to determine the value of ψ1/ψt properly. As a result, it is preferable to properly determine the value of the ratio Ft/f1 of the effective focal length of the whole zoom lens system to the effective focal length of the first lens group G1 in the telescopic end.

When the upper limit of the condition (3) is violated, the effective focal length f1 of the first lens group G1 becomes large toward the positive side and then the whole length of the zoom lens in the telescopic end becomes large. On the other hand, when the lower limit of the condition (3) is violated, the effective focal length f1 of the first lens group G1 becomes large toward the positive side. Therefore, the whole length of the zoom lens in the telescopic end can be reduced, but it becomes difficult to correct the axial aberrations and the off-axial aberrations preferably.

The condition (4) defines the ratio of the effective focal length of the fourth lens group G4 to the effective focal length of the second lens group G2.

The whole length of the zoom lens in the telescopic end is expressed by the equation (o) as mentioned above. When the expression (p) is satisfied for the miniaturization, the larger the distance dt12 between the position of the principal point of the first lens group G1 in the telescopic end and the position of the composite principal point of the second lens group G2, the third lens group G3 and the fourth lens group G4 becomes, the smaller the whole length of the zoom lens becomes.

When the upper limit of the condition (4) is violated, a sufficient back focus can be obtained in the wide-angle end and the effective diameters of the rear lenses can be reduced. However, as the position of the composite principal point of the second lens group G2, the third lens group G3 and the fourth lens group G4 gradually approaches the object side, the distance dt12 becomes small and the whole length of the zoom lens in the telescopic end becomes large.

On the other hand, when the lower limit of the condition (4) is violated, as the effective focal length of the second lens group G2 becomes large as compared to that of the fourth lens group G4 and the position of the composite principal point of the second lens group G2, the third lens group G3 and the fourth lens group G4 gradually approaches the image side, the distance dt12 becomes large and the reduction of the whole length of the zoom lens in the telescopic end can be achieved. However, it becomes difficult to obtain a sufficient back focus in the wide-angle end and to correct the positive distortion preferably.

In the present invention, besides satisfying the above conditions, it is preferable to move the first lens group G1 and the fourth lens group G4 together as one body in the refractive power varying operation from the wide-angle end to the telescopic end. By moving the first lens group G1 and the fourth lens group G4 together as one body, it is possible to form the lens barrel simply.

Also, in the present invention, it is possible to achieve high performance and great zoom ratio by disposing an aspherical surface in each of the lens groups.

Further, it is possible to correct a change of an image position due to movement of hands, etc., by shifting one or a plurality of lens groups in the direction perpendicular to the optical axis. That is, a so-called vibration correcting effect can be obtained.

Preferred embodiments of the present invention will be described hereinafter with reference to the drawings.

DETAILED DESCRIPTION OF THE PREFERRED EMBODIMENTS

Figure 1:
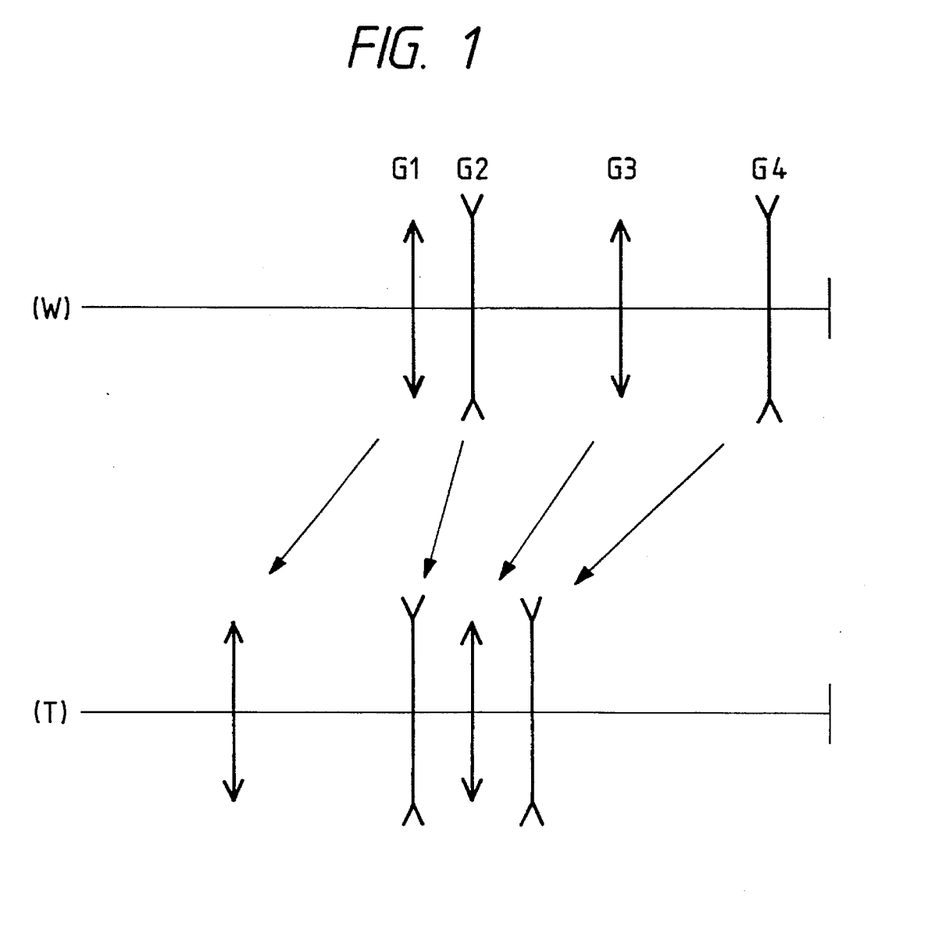
FIG. 1 shows the basic structure of a zoom lens according to each embodiment of the present invention and the state of movement of lens groups thereof in a refractive power varying operation from a wide-angle end (W) to a telescopic end (T)

FIG. 1 shows the basic structure of a zoom lens according to each embodiment of the present invention and the state of movement of lens groups thereof in a refractive power varying operation from a wide-angle end (W) to a telescopic end (T).

As shown in FIG. 1, in each embodiment of the present invention, the zoom lens has, in the following order from the object side, a first lens groups G1 with a positive refractive power, a second lens group G2 with a negative refractive power, a third lens group G3 with a positive refractive power and a fourth lens group G4 with a negative refractive power. In a refractive power varying operation from a wide-angle end to a telescopic end, the first lens group G1 to the fourth lens group G4 are moved toward the object side such that the distance of an air space between the first lens group G1 and the second lens group G2 is increased and the distance of an air space between the third lens group G3 and the fourth lens group G4 is decreased.

Hereinafter, each embodiment of the present invention will be described.

[First Embodiment]

Figure 2:
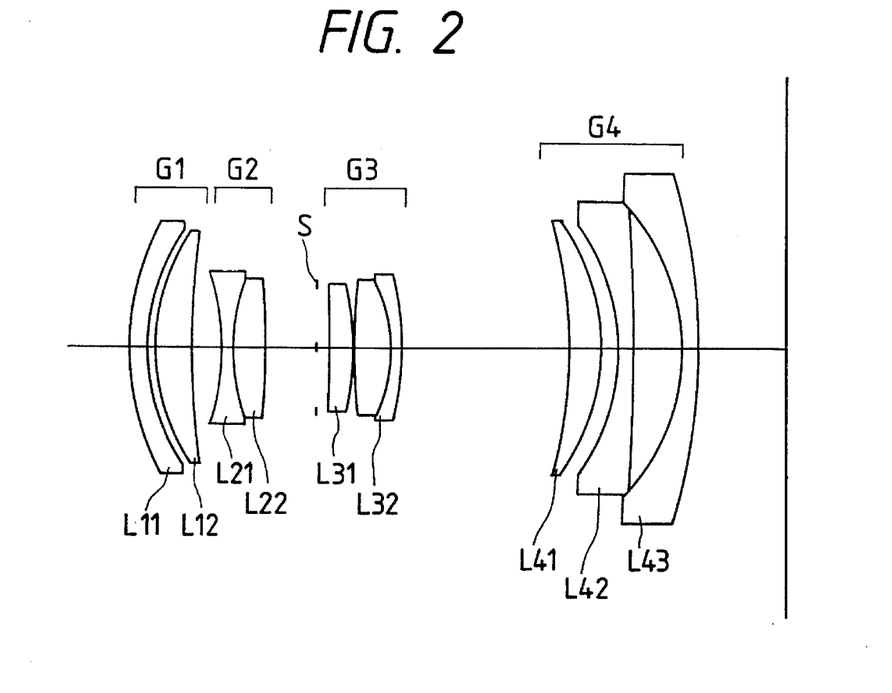
FIG. 2 shows the structure of the zoom lens according to the first embodiment of the present invention.

FIG. 2 shows the structure of the zoom lens of the first embodiment of the present invention.

The zoom lens has, in the following order from the object side, the first lens group G1 consisting of a negative meniscus lens element L11 with a convex surface directed to the object side and a positive meniscus lens element L12 with a convex surface directed to the object side, a second lens group G2 consisting of a cemented lens formed of a biconcave lens element L21 and a biconvex lens element L22, a third lens group G3 consisting of a positive lens element L31 and a positive cemented lens element L32 with a convex surface directed to the image side, and a fourth lens group G4 consisting of a positive meniscus lens element L41 with a convex surface directed to the image side, a negative meniscus lens element L42 with a convex surface directed to the image side and a negative meniscus lens element L43 with a convex surface directed to the image side.

Also, a stop S is disposed between the second lens group G2 and the third lens group G3 and is moved together with the third lens group G3 as one body in a refractive power varying operation from the wide-angle end to the telescopic end.

FIG. 2 shows a positional relationship of the respective lens groups in the wide-angle end, and the respective lens groups are moved on the optical axis along the zoom loci as indicated by the arrows in FIG. 1.

Values of various element in the first embodiment of the present invention are shown in the following Table 1. In the Table 1, f, FNO and 2ω represent the effective focal length, the F-number and the angle of view. Further, the values of the refractive index and Abbe number correspond to the d-lines ($\lambda=587.6$ mn).

[TABLE 1]

f = 39.0–70.0–107.0 mm
FNO = 4.2–6.0–8.0
2ω = 57.6–33.4–22.4

| Surface Number | Radius of Curvature | Distance of Lens Surfaces | Refractive Power | Abbe Number |
|---|---|---|---|---|
| 1 | 23.7779 | 1.300 | 1.80518 | 25.35 |
| 2 | 16.9083 | 0.500 | | |
| 3 | 16.6118 | 3.000 | 1.62041 | 60.14 |
| 4 | 68.2170 | (d4 = Variable) | | |
| 5 | −19.9423 | 1.000 | 1.77279 | 49.45 |
| 6 | 17.3292 | 2.500 | 1.75692 | 31.62 |
| 7 | −68.9474 | (d7 = Variable) | | |
| 8 | 0.0000 | 1.000 | (Stop) | |
| 9 | −515.1143 | 2.000 | 1.62041 | 60.14 |
| 10 | −26.8403 | 0.100 | | |
| 11 | 50.7926 | 3.000 | 1.51860 | 69.98 |
| 12 | −12.1065 | 1.000 | 1.78472 | 25.80 |
| 13 | −21.2426 | (d13 = variable) | | |
| 14 | −36.6000 | 2.600 | 1.78472 | 25.80 |
| 15 | −17.6696 | 1.300 | | |
| 16 | −17.9130 | 1.300 | 1.77279 | 49.45 |
| 17 | −198.7126 | 4.000 | | |
| 18 | −16.8705 | 1.200 | 1.67025 | 57.53 |
| 19 | −52.3365 | (Bf) | | |

(Variable Distance in Refractive Power Varying Operation)

| | | | |
|---|---|---|---|
| f | 39.0000 | 70.0000 | 107.0000 |
| d4 | 2.3824 | 11.7053 | 17.1107 |
| d7 | 4.1160 | 2.3894 | 1.3753 |
| d13 | 13.7933 | 6.1970 | 1.8057 |
| Bf | 7.3623 | 25.6179 | 46.3342 |

(values corresponding to conditions)

(1) $\Delta\psi \cdot \Delta F = 1.615$
(2) $Fw/r4 = -0.745$
(3) $f1/Ft = 0.601$
(4) $f4/f2 = 0.645$

[Second Embodiment]

Figure 3:
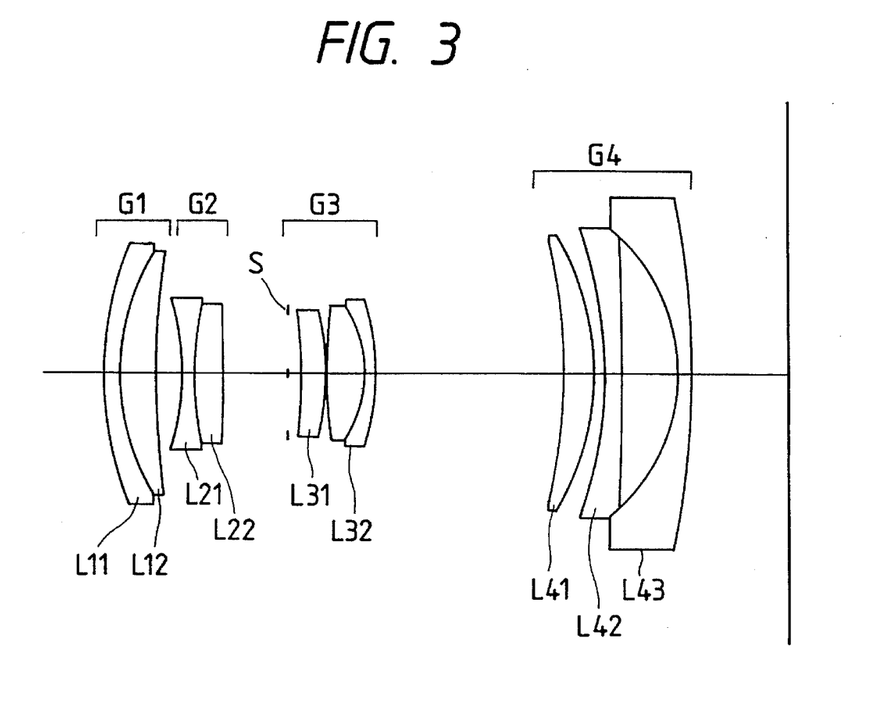
FIG. 3 shows the structure of the zoom lens according to the second embodiment of the present invention.

FIG. 3 shows the structure of the zoom lens according to the second embodiment of the present invention.

The zoom lens has, in the following order from the object side, the first lens group G1 consisting of a positive cemented lens element L11 with a convex surface directed to the object side, the second lens group G2 consisting of a cemented lens formed of a biconcave lens element L21 and a biconvex lens element L22, the third lens group G3 consisting of a positive lens element L31 and a cemented lens element L32 with a convex surface directed to the image side, and the fourth lens group G4 consisting of a positive meniscus lens element L41 with a convex surface directed to the image side, a negative meniscus lens element L42 with a convex surface directed to the image side and a negative meniscus lens element L43 with a convex surface directed to the image side.

Also, a stop S is disposed between the second lens group G2 and the third lens group G3 and is moved together with the third lens group G3 as one body in a refractive power varying operation from a wide-angle end to a telescopic end.

FIG. 3 shows a positional relationship of the respective lens groups in the wide-angle end and the respective lens groups are moved on the optical axis long the zoom loci as indicated by arrows in FIG. 1.

The zoom lens of the second embodiment has a similar structure to that of the first embodiment, but the refractive powers and shapes of the respective lens groups are different from those of the lens groups in the first embodiment.

The values of various elements of the second embodiment of the present invention are shown in the following Table 2. In the Table 2, f, FNO and 2ω represent the effective focal length, the F-number and the angle of view. Further, the values of the refractive index and Abbe number correspond to the d-lines ($\lambda=587.6$ nm).

[TABLE 2]

f = 39.0–70.0–107.0 mm
FNO = 4.3–6.2–8.1
2ω = 58.2–33.6–22.4

| Surface Number | Radius of Curvature | Distance of Lens Surfaces | Refractive Power | Abbe Number |
|---|---|---|---|---|
| 1 | 26.3434 | 1.300 | 1.80518 | 25.35 |
| 2 | 18.7572 | 3.000 | 1.62041 | 60.14 |
| 3 | 77.7584 | (d3 = Variable) | | |
| 4 | −22.2793 | 1.000 | 1.77279 | 49.45 |
| 5 | 25.0987 | 2.500 | 1.75520 | 27.61 |
| 6 | −87.6627 | (d6 = Variable) | | |
| 7 | 0.0000 | 1.000 | (Stop) | |
| 8 | −71.9016 | 2.000 | 1.62041 | 60.14 |
| 9 | −28.6378 | 0.100 | | |
| 10 | 36.3811 | 3.000 | 1.51860 | 69.98 |
| 11 | −11.7850 | 1.000 | 1.78472 | 25.80 |
| 12 | −20.2043 | (d12 = variable) | | |
| 13 | −47.1951 | 2.600 | 1.78472 | 25.80 |
| 14 | −20.9986 | 1.000 | | |
| 15 | −30.3294 | 1.300 | 1.74810 | 52.30 |
| 16 | −326.1027 | 4.600 | | |
| 17 | −15.0000 | 1.200 | 1.71300 | 53.93 |
| 18 | −66.0303 | (Bf) | | |

(Variable Distance in Refractive Power Varying Operation)

| | | | |
|---|---|---|---|
| f | 39.0000 | 70.0000 | 107.0000 |
| d3 | 1.9807 | 12.7342 | 19.5764 |
| d6 | 5.0757 | 3.0925 | 1.3348 |
| d12 | 15.3649 | 6.5946 | 1.5101 |
| Bf | 7.8564 | 27.0600 | 47.8471 |

(values corresponding to conditions)

(1) $\Delta\psi \cdot \Delta F = 1.519$
(2) $Fw/r4 = -0.591$

[TABLE 2]-continued f = 39.0–70.0–107.0 mm
FNO = 4.3–6.2–8.1
2ω = 58.2–33.6–22.4

(3) f1/Ft = 0.696
(4) f4/f2 = 0.699

[Third Embodiment]

Figure 4:
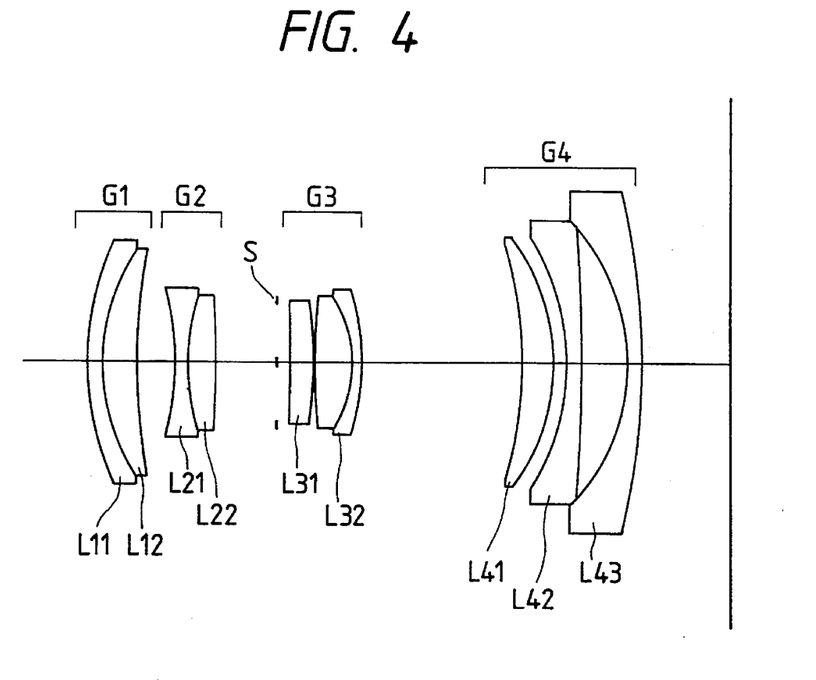
FIG. 4 shows the structure of the zoom lens according to the third embodiment of the present invention.

FIG. 4 shows the structure of the zoom lens according to the third embodiment of the present invention.

The zoom lens has, in the following order from the object side, the first lens group G1 consisting of a cemented lens element L11 with a convex surface directed to the object side, the second lens group G2 consisting of a positive cemented lens formed of a biconcave lens element L21 and a biconvex lens element L22, the third lens group G3 consisting of a positive lens element L31 and a positive cemented lens element L32 with a convex surface directed to the image side, and the fourth lens group G4 consisting of a positive meniscus lens element L41 with a convex surface directed to the image side, a negative meniscus lens element L42 with a convex surface directed to the image side and a negative meniscus lens element L43 with a convex surface directed to the image side.

Also, a stop S is disposed between the second lens group G2 and the third lens group G3 and is moved together with the third lens group G3 as one body in a refractive power varying operation from a wide-angle end to a telescopic end.

FIG. 4 shows a positional relationship of the respective lens groups in the wide-angle end and the respective lens groups are moved on the optical axis long the zoom loci as indicated by arrows in FIG. 1.

The zoom lens of the third embodiment has a similar structure to that of the second embodiment, but the refractive powers and shapes of the respective lens groups are different from those of the lens groups in the second embodiment.

The values of various elements of the third embodiment of the present invention are shown in the following Table 3. In the Table 3, f, FNO and 2ω represent the effective focal length, the F-number and the angle of view. Further, the values of the refractive index and Abbe number correspond to the d-lines (λ=587.6 nm).

[TABLE 3]

f = 39.0–69.6–107.0 mm
FNO = 4.1–6.0–8.0
2ω = 58.0–33.8–22.6

| Surface Number | Radius of Curvature | Distance of Lens Surfaces | Refractive Power | Abbe Number |
| --- | --- | --- | --- | --- |
| 1 | 23.7089 | 1.300 | 1.80518 | 25.35 |
| 2 | 17.2905 | 3.000 | 1.62041 | 60.14 |
| 3 | 60.0753 | (d3 = Variable) | | |
| 4 | –22.3825 | 1.000 | 1.78797 | 49.45 |
| 5 | 17.1966 | 2.500 | 1.75692 | 31.62 |
| 6 | –61.4441 | (d6 = Variable) | | |
| 7 | 0.0000 | 1.000 | | (Stop) |
| 8 | 962.3482 | 2.000 | 1.62041 | 60.14 |
| 9 | –42.4347 | 0.100 | | |
| 10 | 44.7533 | 3.000 | 1.51860 | 69.98 |
| 11 | –11.0879 | 1.000 | 1.78472 | 25.80 |
| 12 | –18.6202 | (d12 = Variable) | | |
| 13 | –34.0671 | 2.600 | 1.78472 | 25.80 |
| 14 | –17.1462 | 1.300 | | |
| 15 | –17.9753 | 1.300 | 1.71300 | 53.93 |
| 16 | –112.1175 | 4.000 | | |
| 17 | –16.0000 | 1.200 | 1.71300 | 53.93 |
| 18 | –57.7215 | (Bf) | | |

[TABLE 3]-continued f = 39.0–69.6–107.0 mm
FNO = 4.1–6.0–8.0
2ω = 58.0–33.8–22.6

(Variable Distance in Refractive Power Varying Operation)

| | | | |
| --- | --- | --- | --- |
| f | 39.0000 | 69.6000 | 107.0000 |
| d3 | 3.0502 | 12.3270 | 18.1566 |
| d6 | 5.1544 | 3.4619 | 1.9829 |
| d12 | 13.6952 | 6.1109 | 1.7602 |
| Bf | 7.3897 | 25.9418 | 46.7306 |

(values corresponding to conditions)

(1) Δψ · ΔF = 1.583
(2) Fw/r4 = –0.676
(3) f1/Ft = 0.672
(4) f4/f2 = 0.563

[Fourth Embodiment]

Figure 5:
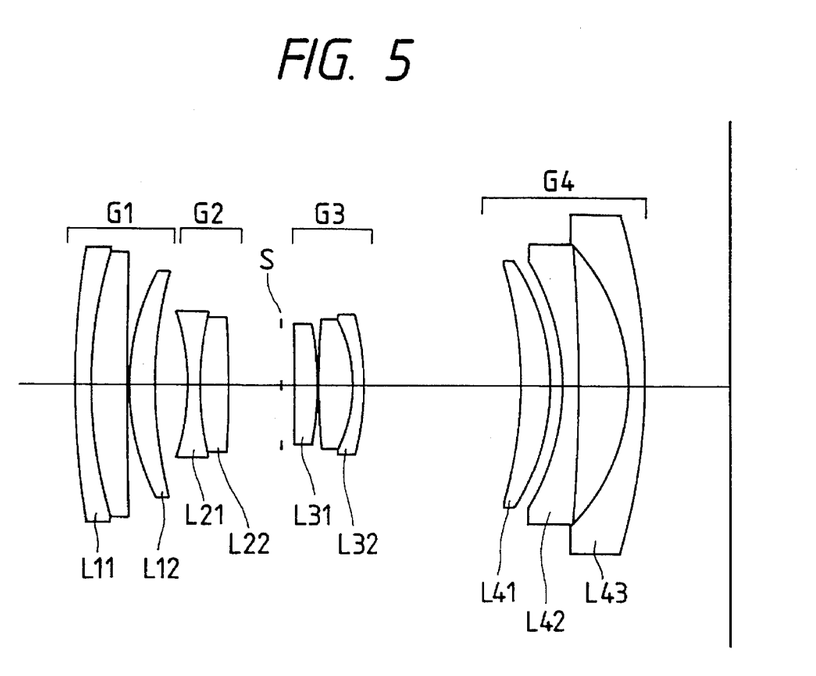
FIG. 5 shows the structure of the zoom lens according to the fourth embodiment of the present invention.

FIG. 5 shows the structure of the zoom lens according to the fourth embodiment of the present invention.

The zoom lens has, in the following order from the object side, the first lens group G1 consisting of a cemented lens element L11 with a convex surface directed to the object side and a positive meniscus lens element L12 with a convex surface directed to the object side, the second lens group G2 consisting of a biconcave lens element L21 and a biconvex lens element L22, the third lens group G3 consisting of a positive lens element L31 and a positive cemented lens element L32 with a convex surface directed to the image side, and the fourth lens group G4 consisting of a positive meniscus lens element L41 with a convex surface directed to the image side, a negative meniscus lens element L42 with a convex surface directed to the image side and a negative meniscus lens element L43 with a convex surface directed to the image side.

Also, a stop S is disposed between the second lens group G2 and the third lens group G3 and is moved together with the third lens group G3 as one body in a refractive power varying operation from a wide-angle end to a telescopic end.

FIG. 5 shows a positional relationship of the respective lens groups in the wide-angle end and the respective lens groups are moved on the optical axis long the zoom loci is indicated by arrows in FIG. 1.

The zoom lens of the fourth embodiment has a similar structure to that of the first embodiment, but the refractive powers and shapes of the respective lens groups are different from those of the lens groups in the first embodiment.

The values of various elements of the fourth embodiment of the present invention are shown in the following Table 4. In the Table 4, f, FNO and 2ω represent the effective focal length, the F-number and the angle of view. Further, the values of the refractive index and Abbe number correspond to the d-lines (λ=587.6 nm).

[TABLE 4]

f = 39.0–69.7–107.0 mm
FNO = 4.2–6.0–8.0
2ω = 57.2–33.6–22.4

| Surface Number | Radius of Curvature | Distance of Lens Surfaces | Refractive Power | Abbe Number |
| --- | --- | --- | --- | --- |
| 1 | 84.6630 | 1.300 | 1.80518 | 25.35 |
| 2 | 39.6248 | 3.000 | 1.58913 | 61.09 |
| 3 | 787.3008 | 0.100 | | |

[TABLE 4]-continued f = 39.0–69.7–107.0 mm
FNO = 4.2–6.0–8.0
2ω = 57.2–33.6–22.4

| | | | | |
|---|---|---|---|---|
| 4 | 20.0533 | 2.000 | 1.62041 | 60.14 |
| 5 | 30.9558 | (d5 = Variable) | | |
| 6 | −20.8912 | 1.000 | 1.79668 | 45.37 |
| 7 | 23.6806 | 2.500 | 1.79504 | 28.56 |
| 8 | −55.9696 | (d8 = Variable) | | |
| 9 | 0.0000 | 1.000 | | (Stop) |
| 10 | 218.5400 | 2.000 | 1.62041 | 60.14 |
| 11 | −32.7974 | 0.100 | | |
| 12 | 73.4875 | 3.000 | 1.51860 | 69.98 |
| 13 | −11.6767 | 1.000 | 1.78472 | 25.80 |
| 14 | −20.4780 | (d14 = Variable) | | |
| 15 | −33.0645 | 2.500 | 1.78472 | 25.80 |
| 16 | −17.6209 | 1.000 | | |
| 17 | −19.1448 | 1.300 | 1.71300 | 53.93 |
| 18 | −164.5709 | 4.400 | | |
| 19 | −16.2067 | 1.200 | 1.71300 | 53.93 |
| 20 | −51.9683 | (Bf) | | |

(Variable Distance in Refractive Power Varying Operation)

| f | 39.0000 | 69.7000 | 107.0000 |
|---|---|---|---|
| d5 | 2.8298 | 12.3374 | 18.1772 |
| d8 | 4.3083 | 2.5194 | 1.1457 |
| d14 | 13.3722 | 5.6535 | 1.1874 |
| Bf | 7.1819 | 25.7482 | 46.8950 |

(values corresponding to conditions)

(1) Δψ · ΔF = 1.599
(2) Fw/r4 = −0.750
(3) f1/Ft = 0.626
(4) f4/f2 = 0.536

[Fifth Embodiment]

Figure 6:
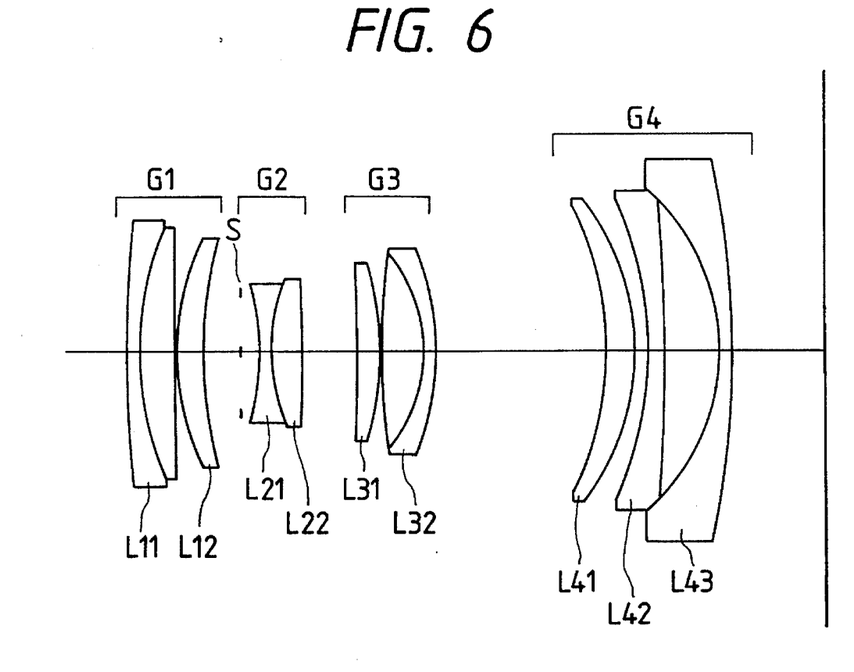
FIG. 6 shows the structure of the zoom lens according to the fifth embodiment of the present invention.

FIG. 6 shows the structure of the zoom lens according to the fifth embodiment of the present invention.

The zoom lens has, in the following order from the object side, the first lens group G1 consisting of a cemented lens element L11 with a convex surface directed to the object side and a positive meniscus lens element L12 with a convex surface directed to the object side, the second lens group G2 consisting of a cemented lens formed of a biconcave lens element L21 and a biconvex lens element L22, the third lens group G3 consisting of a positive lens element L31 and a positive cemented lens element L32 with a convex surface directed to the image side, and the fourth lens group G4 consisting of a positive meniscus lens element L41 with a convex surface directed to the image side, a negative meniscus lens element L42 with a convex surface directed to the image side and a negative meniscus lens element L43 with a convex surface directed to the image side.

Also, a stop S is disposed between the first lens group G1 and the second lens-group G2 and is moved together with the second lens group G2 as one body in a refractive power varying operation from a wide-angle end to a telescopic end.

FIG. 6 shows a positional relationship of the respective lens groups in the wide-angle end and the respective lens groups are moved on the optical axis long the zoom loci as indicated by arrows in FIG. 1.

The zoom lens of the fifth embodiment has a similar structure to that of the first embodiment, but the refractive powers and shapes of the respective lens groups are different from those of the lens groups in the first embodiment.

The values of various elements of the fifth embodiment of the present invention are shown in the following Table 5. In the Table 5, f, FNO and 2ω represent the effective focal length, the F-number and the angle of view. Further, the values of the refractive index and Abbe number correspond to the d-lines (λ=587.6 nm).

[TABLE 5]

f = 39.0–70.4–107.0 mm
FNO = 4.0–6.0–8.0
2ω = 57.2–33.2–22.4

| Surface Number | Radius of Curvature | Distance of Lens Surfaces | Refractive Power | Abbe Number |
|---|---|---|---|---|
| 1 | 71.7679 | 1.300 | 1.80384 | 33.89 |
| 2 | 25.5759 | 2.700 | 1.58913 | 61.09 |
| 3 | 784.7060 | 0.100 | | |
| 4 | 19.6084 | 2.300 | 1.62041 | 60.14 |
| 5 | 31.7562 | (d5 = Variable) | | |
| 6 | 0.0000 | 1.500 | | (Stop) |
| 7 | −19.1326 | 1.000 | 1.79668 | 45.37 |
| 8 | 15.1569 | 2.500 | 1.79504 | 28.56 |
| 9 | −79.0196 | (d9 = Variable) | | |
| 10 | 911.4988 | 2.000 | 1.62041 | 60.14 |
| 11 | −23.8323 | 0.100 | | |
| 12 | 58.9542 | 3.300 | 1.51860 | 69.98 |
| 13 | −11.7249 | 1.000 | 1.78472 | 25.80 |
| 14 | −21.0244 | (d14 = Variable) | | |
| 15 | −26.7893 | 2.500 | 1.78472 | 25.80 |
| 16 | −18.8191 | 1.000 | | |
| 17 | −28.4817 | 1.300 | 1.71300 | 53.93 |
| 18 | −164.5709 | 4.400 | | |
| 19 | −16.2067 | 1.200 | 1.71300 | 53.93 |
| 20 | −64.8034 | (Bf) | | |

(Variable Distance in Refractive Power Varying Operation)

| f | 39.0000 | 70.4000 | 107.0000 |
|---|---|---|---|
| d5 | 2.8209 | 12.3285 | 18.1683 |
| d8 | 4.1692 | 2.3803 | 1.0066 |
| d14 | 13.4931 | 5.7744 | 1.3083 |
| Bf | 7.2966 | 25.6158 | 45.5701 |

(values corresponding to conditions)

(1) Δψ · ΔF = 1.765
(2) Fw/r4 = −0.602
(3) f1/Ft = 0.623
(4) f4/f2 = 0.737

[Sixth Embodiment]

Figure 7:
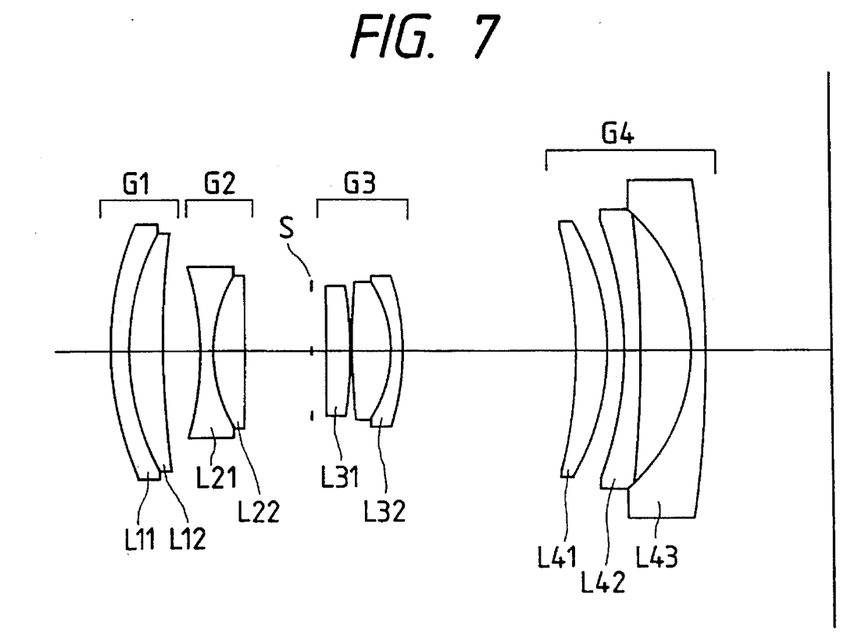
FIG. 7 shows the structure of the zoom lens according to the sixth embodiment of the present invention.

FIG. 7 shows the zoom lens according to the sixth embodiment of the present invention.

The zoom lens has, in the following order from the object side, the first lens group G1 consisting of a positive cemented lens element L11 with a convex surface directed to the object side, the second lens group G2 consisting of a cemented lens formed of a biconcave lens element L21 and a biconvex lens element L22, the third lens group G3 consisting of a positive lens element L31 and a positive cemented lens element L32 with a convex surface directed to the image side, and the fourth lens group G4 consisting of a positive meniscus lens element L41 with a convex surface directed to the image side, a negative meniscus lens element L42 with a convex surface directed to the image side and a negative meniscus lens element L43 with a convex surface directed to the image side.

Also, a stop S is disposed between the second lens group G2 and the third lens group G3 and is moved together with the third lens group G3 as one body in a refractive power varying operation from a wide-angle end to a telescopic end.

FIG. 7 shows a positional relationship of the respective lens groups in the wide-angle end and the respective lens groups are moved on the optical axis long the zoom loci as indicated by arrows in FIG. 1.

The zoom lens of the sixth embodiment has a similar structure to that of the second embodiment, but the refractive powers and shapes of the respective lens groups are different from those of the lens groups in the second embodiment.

The values of various elements of the sixth embodiment of the present invention are shown in the following Table 6.

In the Table 6, f, FNO and 2ω represent the effective focal length, the F-number and the angle of view. Further, the values of the refractive index and Abbe number correspond to the d-lines (λ=587.6 nm).

[TABLE 6]

f = 39.0–70.0–107.0 mm
FNO = 4.4–6.0–8.0
2ω = 59.2–33.6–22.4

| Surface Number | Radius of Curvature | Distance of Lens Surfaces | Refractive Power | Abbe Number |
|---|---|---|---|---|
| 1 | 25.5562 | 1.300 | 1.80518 | 25.35 |
| 2 | 18.1629 | 3.000 | 1.62041 | 60.14 |
| 3 | 79.5064 | (d3 = Variable) | | |
| 4 | −22.1277 | 1.000 | 1.78797 | 49.45 |
| 5 | 12.4827 | 2.500 | 1.75692 | 31.62 |
| 6 | 10327.0710 | (d6 = Variable) | | |
| 7 | 0.0000 | 1.000 | | (Stop) |
| 8 | 84.0662 | 2.000 | 1.58913 | 61.09 |
| 9 | −33.9478 | 0.100 | | |
| 10 | 48.8731 | 3.000 | 1.51860 | 69.98 |
| 11 | −11.3722 | 1.000 | 1.78472 | 25.80 |
| 12 | −19.5932 | (d12 = Variable) | | |
| 13 | −40.2371 | 2.600 | 1.78472 | 25.80 |
| 14 | −19.7127 | 1.300 | | |
| 15 | −28.3502 | 1.300 | 1.71300 | 53.93 |
| 16 | −115.0414 | 4.000 | | |
| 17 | −14.6652 | 1.200 | 1.71300 | 53.93 |
| 18 | −92.2345 | (Bf) | | |

(Variable Distance in Refractive Power Varying Operation)

| f | 39.0000 | 70.0000 | 107.0000 |
|---|---|---|---|
| d3 | 2.8416 | 12.8848 | 19.3321 |
| d6 | 5.3485 | 2.7058 | 1.0051 |
| d12 | 13.5550 | 6.1545 | 1.4079 |
| Bf | 9.9222 | 27.5360 | 46.8552 |

(values corresponding to conditions)

(1) Δψ · ΔF = 1.556
(2) Fw/r4 = −0.423
(3) f1/Ft = 0.656
(4) f4/f2 = 0.958

Other aspects of the present invention will be apparent to a person with ordinary skill in the art. The present invention therefore is not intended to be limited to the preferred embodiments described herein but rather is defined by the claims and equivalents thereof.

What is claimed is:

1. A zoom lens comprising in the following order from the object side:

a first lens group with a positive refractive power;

a second lens group with a negative refractive power;

a third lens group with a positive refractive power; and a fourth lens group with a negative refractive power;

wherein in a refractive power varying operation from a wide-angle end to a telescopic end, said first lens group and said fourth lens group are moved toward the object side, the distance of an air space between said first lens group and said second lens group is increased and the distance of an air space between said third lens group and said fourth lens group is decreased, and if the refractive power of said third lens group is ψ3, the refractive power of said fourth lens group is ψ4, the axial distance between the air space between said third lens group and said fourth lens group in the wide-angle end is dw34, the axial distance between the air space between said third lens group and said fourth lens group in the telescopic end is dt34, an effective focal length of the whole zoom lens system in the wide-angle end is Fw, an effective focal length of the whole zoom lens system in the telescopic end is Ft, and a radius of curvature of a lens surface of said fourth lens group located closest to the image side is r4, the following condition is satisfied:

$$1.47 < (dt34 - dw34) \cdot \psi3 \cdot \psi4 \cdot (Ft - Fw) < 2.00, \quad Fw/r4 < -0.1.$$

2. A zoom lens according to claim 1, wherein if an effective focal length of said first lens group is f1, an effective focal length of said second lens group is f2, an effective focal length of said fourth lens group is f4, and the effective focal length of the whole zoom lens system in the telescopic end is Ft, the following condition is satisfied:

$$0.4 < f1/Ft < 0.8,$$

$$0.4 < f4/f2 < 1.0.$$

3. A zoom lens according to claim 2, wherein said first lens group and said fourth lens group are moved together as one body in the refractive power varying operation from the wide-angle end to the telescopic end.

4. A zoom lens according to claim 3, wherein the distance of an air space between said second lens group and said third lens group is decreased in the refractive power varying operation from the wide-angle end to the telescopic end.

5. A zoom lens according to claim 4, wherein a composite refractive power of said first lens group and said second lens group is negative in the wide-angle end.

6. A zoom lens according to claim 5, wherein a composite refractive power of said second lens group and said third lens group is negative in the telescopic end.

* * * * *